United States Patent Office 3,238,451
Patented Mar. 1, 1966

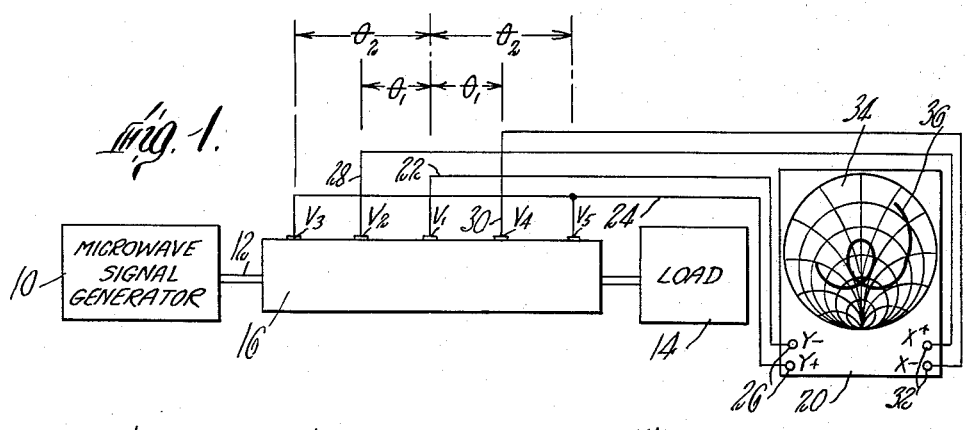
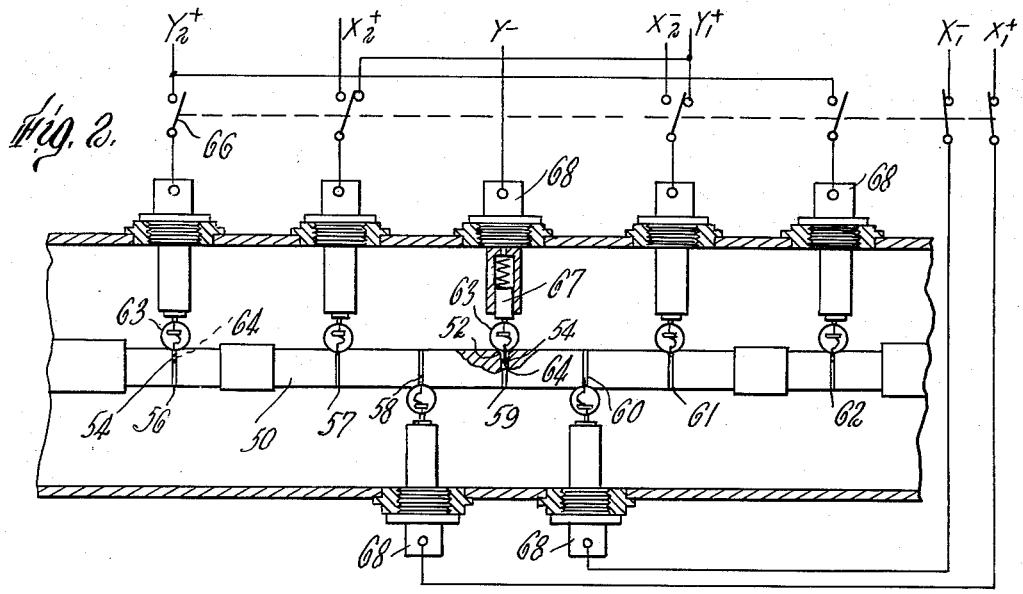
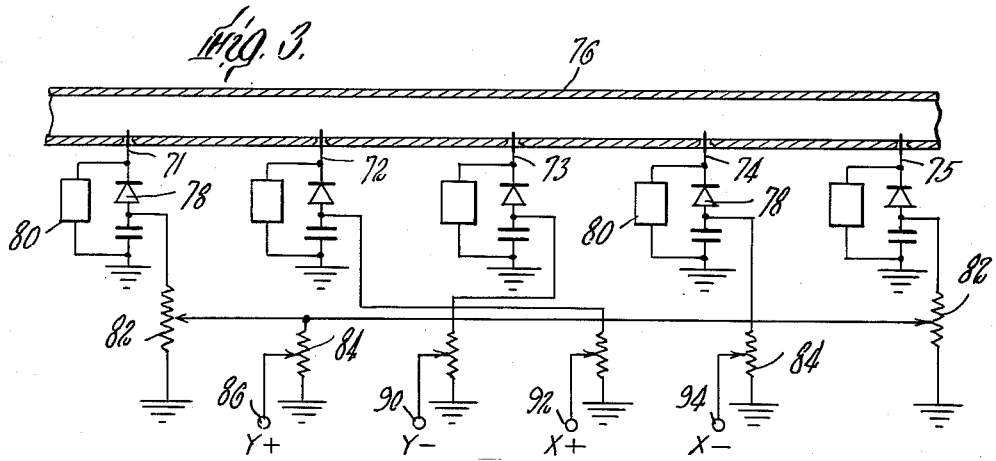

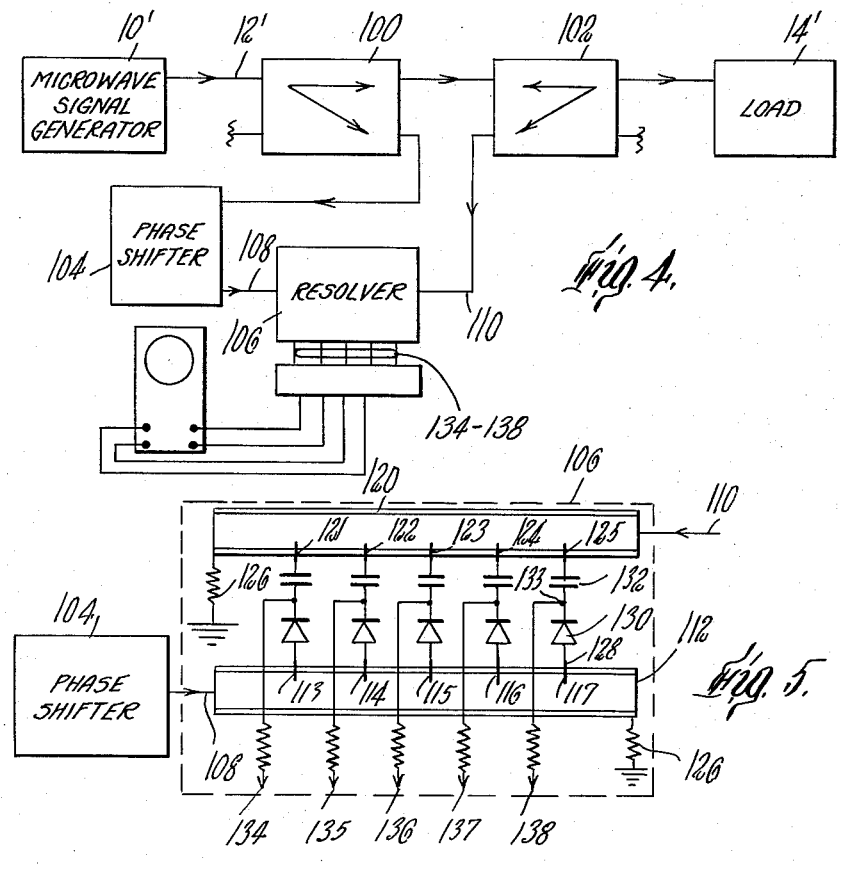
Fig. 4.
Fig. 5.
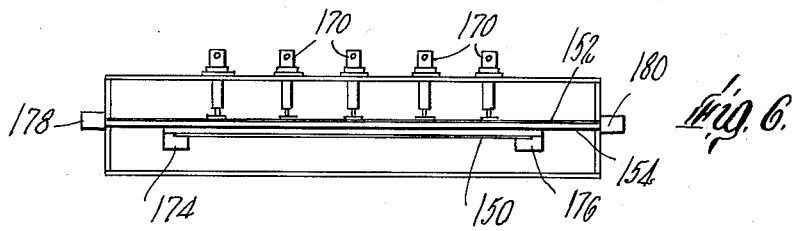
Fig. 6.
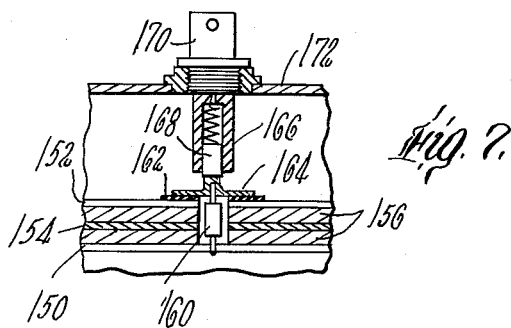
Fig. 7.

3,238,451
ELECTROMAGNETIC WAVE CHARACTERISTIC DISPLAY APPARATUS INCLUDING MULTIPLE PROBE MEANS
Edward H. Shively, Raymond, Maine, assignor to Dielectric Products Engineering Company, Inc., Raymond, Maine, a corporation of Michigan
Filed Apr. 11, 1962, Ser. No. 186,714
20 Claims. (Cl. 324—58)

This invention relates to measuring apparatus for use on systems operative at ultrahigh and microwave frequencies, and more particularly to apparatus useful in the measurements of impedance characteristics and transmission characteristics as of radio frequency wave transmission and absorption devices.

In the past, a classic tool for the measurement of impedances at these frequencies has been the movable probe and slotted line. One of the main drawbacks of that apparatus is that it does not provide indications of impedance directly. Rather, it is necessary to measure the location and magnitude of maxima and minima of standing waves on the system under investigation. From these measurements it is then possible to calculate the reflection coefficient at the frequency of measurement which is a function of the impedance of the devices and the transmission medium to which it is connected. This is a time consuming, tedious procedure even where a Smith chart is used as an aid. It is especially cumbersome where the impedance characteristics of a device over a band of frequencies must be determined.

To overcome these drawbacks there has been considerable work on the development of impedance measuring apparatus which enable the display of reflection coefficient information on indicating devices such as cathode ray oscilloscopes. One type of this apparatus is disclosed in the Samual patent, No. 2,605,323. However, such an arrangement, while an improvement over the slotted line apparatus, has a limitation that it provides accurate information only at the frequency for which it is designed. To overcome this limitation several impedance plotting devices have been developed in which the value of an impedance may be obtained over a continuous frequency band of substantial width. Such apparatus have been complex devices, as for example the hybrid junction arrangement disclosed in the Alford patent, No. 2,983,866; and the directional coupler hybrid and amplitude modulation arrangement disclosed in the Vinding patent, No. 2,876,416. Such systems are costly and must be carefully designed as, for example, unless the hybrid junctions are of high quality and precisely compensated, they will introduce reflections of sufficient magnitude that impair the accuracy of the measurements.

Accordingly, it is an object of this invention to provide an improved direct indicating apparatus of simplified nature for deriving data such as impedance measurement information over a band of frequencies in the ultrahigh frequency and microwave regions.

Another object of the invention is to provide novel and improved electric field sampling apparatus for extracting and combining energy for plotting transmission and impedance data over a continuous spectrum of frequencies.

A further object of the invention is to provide a versatile, economical and accurate apparatus, both easy and rapid in operation, for extracting signals from electromagnetic wave transmission and absorption devices operative in the ultra high and microwave frequency regions, and combining those signals to provide precise phase information on characteristics of the devices over a continuous band of frequencies.

Still another object of the invention is to provide an improved impedance measuring and indicating apparatus for extracting electric wave components and combining those components in suitable form for application to a cathode ray oscilloscope to display complex impedance values directly.

The invention employs five identical electromagnetic field probes spaced as a function of frequency in the region of interest along an electromagnetic wave transmission medium which extract signals as a function of the sensed field strength. A suitable signal source is utilized to provide constant amplitude input signals to the electromagnetic wave transmission medium over the frequency range of interest for application to the load under investigation. The five probes, which sense the strength of the electric field, for example, at points along the transmission medium, are arranged symmetrically. The signals from the two outside probes are combined with the signal from the center probe to provide an information signal related to a first reference plane. The signals from the two intermediate probes (immediately adjacent the center probe) are combined to provide a second information signal related to a reference plane in quadrature to the first reference plane. This symmetrical arrangement of probes eliminates all phase errors that have so troubled the art that resort has been made to exceedingly complex and expensive plotting equipment systems. The apparatus of the invention provides an easy to operate and versatile device which permits rapid and accurate investigation of characteristics of wave transmission and absorption devices over a band of frequencies. While some magnitude error is introduced in the output of the apparatus at the extremities of the frequency range, the deviation is easily calculable and circuit compensation can be readily made for the error if desired. The invention enables accurate display of complex impedance or admittance values for example over a wide band of frequencies. It is of great use in the ultra high and microwave frequency ranges and may be employed in strip line, coaxial and waveguide configuration.

Additional objects, features and advantages of the invention will be seen as the following description of a preferred embodiment thereof progresses in conjunction with the drawings, in which:

FIG. 1 is a block diagram of complex impedance plotting apparatus constructed in accordance with principles of the invention;

FIG. 2 is a sectional view of one embodiment of the resolver unit in a coaxial cable system;

FIG. 3 is a diagrammatic view of an embodiment of the resolver unit in a waveguide system;

FIG. 4 is a block diagram view of a second form of complex impedance plotting apparatus in a system having relatively low level signals;

FIG. 5 is a diagrammatic view of the embodiment of FIG. 4 in a waveguide system;

FIG. 6 is a diagrammatic view of the embodiment of FIG. 4 in a strip line system; and FIG. 7 is a sectional view of a portion of the apparatus shown in FIG. 6.

With reference to FIG. 1 there is illustrated a suitable microwave signal generator 10 which preferably is tunable over a range of frequencies so that impedance values, for example, throughout the frequency range, can be plotted. If measurements are desired at a single frequency only, however, the signal generator may be of a fixed frequency type. A suitable signal transmission line 12 connects the generator to a load 14. A resolver, indicated generally as block 16, having a plurality of electric field probes is connected into the transmission line 12 to sense the electric field at spaced points along the line. Included in the electric field probe arrangement, as is described in greater detail hereinafter, are a set of five probes which are spaced at one-eighth wavelength intervals as a function of a center frequency in the band of interest. The intermediate probes are spaced at distances $$\theta_1\left(\frac{\lambda_c}{8}\right)$$

from the center probe and the outside probes are spaced at distances $$\theta_2\left(\frac{\lambda_c}{4}\right)$$

from the center probe. Connected to each probe is a detector. Each probe extracts radio frequency energy from the line and the associated detector converts this energy into an unmodulated signal of magnitude proportional to the square of the magnitude of the extracted RF energy. The signals from these probes are taken out from the resolver 16 and applied to a cathode ray oscilloscope having difference input channels, generally indicated at 20. In one form of measurement the signal from the center probe is taken out over line 22 and the averaged signal from the outside probes is taken out over line 24 for application to the Y or vertical deflection terminals 26 of the oscilloscope. The signals from the intermediate probes are taken out over lines 28 and 30 for application to the X or horizontal deflection terminals 32. A transparent face plate 34, disposed in front of the cathode ray tube, has engraved on it a Smith chart configuration and provides a reference for the information displayed by the trace 36 of the oscilloscope. Preferably this Smith chart is rotatable so that the display can be easily adjusted relative to the chart. The chart may be in normal or expanded scale, and alternatively, other types of charts well known in this art may be substituted for the Smith chart, in each case with suitable recalibration of the apparatus. Other output devices, such as an X—Y chart recorder, may be utilized if desired.

For each frequency within the band of frequencies through which the generator 10 is periodically swept there are produced on output lines 22, 24, 28 and 30 signals applied to difference input channels of the oscilloscope to produce the trace 36 which represents in polar form the magnitude and phase of the reflection coefficient. By reference to the Smith chart the magnitude and phase angle of this quantity may be read directly. With each successive sweep generator cycle the trace is repeated so that even with a relatively low sweep rate, and with an oscilloscope of ordinary persistence, the entire trace of reflection coefficient versus frequency can be viewed, thus providing an immediate and accurate indication of the impedance characteristics of the load under examination.

This embodiment employs five electric field sampling probes which are equally spaced along the transmission line section to which the coherent wave signals are applied. The symmetrical arrangement of electric field probes is easy to adjust and operate, and the arrangement provides perfect quadrature resolution of reflection coefficient information at any frequency. However, there is an amplitude error as a function of the deviation of the test frequency from the center frequency ($\lambda_c$), the useful upper limit of a resolver, for a given spacing of electric field sensors, is ordinarily about three times the lowest frequency of the band. Of course, this amplitude error can be removed by electronic signal operational techniques or by varying the response of the electric field couplers so that accurate resolution of reflection coefficient information over an extremely wide band of frequencies can be obtained.

Mathematically, signals from a five electric probe coupler arrangement may be combined as follows with reference to the diagram of FIG. 1 in which the angles refer to the angle of the reflection coefficient $\rho$ with respect to the incident wave, the voltages V refer to detected voltages, $\rho_r$ is the magnitude of the real component of $\rho$ at the sensing point and $\rho_i$ is the magnitude of the imaginary component of $\rho$ at the sensing point.

Real component:
$$V_1=(1+\rho_r)^2=1+2\rho_r+\rho_r^2$$
$$V_2=|1+\rho_r\epsilon^{-j\theta_1}|^2=(1+\rho_r\cos\theta_1)^2+\rho_r^2\sin^2\theta_1$$
$$V_4=|1+\rho_r\epsilon^{+j\theta_1}|^2=(1+\rho_r\cos\theta_1)^2+\rho_r^2\sin^2\theta_1$$
$$V_3=|1+\rho_r\epsilon^{-j\theta_2}|^2=(1+\rho_r\cos\theta_2)^2+\rho_r^2\sin^2\theta_2$$
$$V_5=|1+\rho_r\epsilon^{+j\theta_2}|^2=(1+\rho_r\cos\theta_2)^2+\rho_r^2\sin^2\theta_2$$

Imaginary component:
$$V_1=1+\rho_i^2$$
$$V_2=|1+j\rho_i\epsilon^{-j\theta_1}|^2=(1+\rho_i\sin\theta_1)^2+\rho_i^2\cos^2\theta_1$$
$$V_4=|1+j\rho_i\epsilon^{+j\theta_1}|^2=(1-\rho_i\sin\theta_1)^2+(\rho_i^2\cos^2\theta^2)$$
$$V_3=|1+j\rho_i\epsilon^{-j\theta_2}|^2=(1+\rho_i\sin\theta_2)^2+\rho_i^2\cos^2\theta_2$$
$$V_5=|1+j\rho_i\epsilon^{+j\theta_2}|^2=(1-\rho_i\sin\theta_2)^2+\rho_i^2\cos^2\theta_2$$

Read-out of $\rho$, real component:

$$V_y=V_y^+-V_y^-=\frac{V_3+V_5}{2}-V_1=1+2\rho_r\cos\theta_2+\rho_r^2\cos^2\theta_2$$
$$\rho_r^2\sin^2\theta_2-(1+2\rho_r+\rho_r^2)=-2\rho_r(1-\cos\theta_2)$$
$$+\rho_r^2\sin^2\theta_2-(1+2\rho_r+\rho_r^2)=-2\rho_r(1-\cos\theta_2)$$
$$V_x=V_x^+-V_x^-=V_2-V_4=0$$

Imaginary component:
$$V_y=\frac{V_3+V_5}{2}-V_1=\tfrac{1}{2}[1+2\rho_i\sin\theta_2+\rho_i^2\sin^2\theta_2+\rho_i^2\cos^2\theta_2$$
$$+(1-2\rho_i\sin\theta_2+\rho_i^2\sin^2\theta_2$$
$$+\rho_i^2\cos^2\theta_2)]$$
$$-(1+\rho_i^2)=\tfrac{1}{2}[2+2\rho_i^2]-(1+\rho_i^2)$$
$$=0$$

$$V_x=V_2-V_4=1+2\rho_i\sin\theta_1+\rho_i^2\sin^2\theta_1+\rho_i^2\cos^2\theta_1$$
$$-[(1-2\rho_i\sin\theta_1+\rho_i^2\sin^2\theta_1)+\rho_i^2\cos^2\theta_1]$$
$$=4\rho_i\sin\theta_1$$

As can be observed from the read-out values the real component $V_y$ is proportional to $\cos\theta$ ($V_x=0$), while the imaginary component $V_x$ is proportional to $\sin\theta$ ($V_y=0$). By making the response of detectors $V_3$ and $V_5$ equal to $$\frac{1}{1-\cos\theta_2}$$

and the response of detectors $V_2$ and $V_4$ equal to $$\frac{1}{\sin\theta_1}$$

amplitude errors in the read-out values can be eliminated.

Apparatus constructed in accordance with principles of the invention is shown in a coaxial line embodiment in FIG. 2. The center conductor 50 of the coaxial wave transmission line is configured to have diode seats in the form of a conical depression 52 and a cylindrical terminal receiving slot 54 at spaced points 56–62 along the center conductor. Each depression receives a diode detector element 63 with its terminal 64 extending through the slot 54 in the conductor 50. A symmetrical arrangement of five crystal diodes at points 57–61, equally spaced at one-eighth wavelength intervals in the configuration of FIG. 1, enables measurements to be made about the reference point defined by the detector at the center point 59. The center conductor 50 is undercut as indicated in FIG. 2 over the entire length of the detector sensing area to provide compensation for diode capacitance. Two additional crystal diodes at points 56, 62 are spaced at an effective one-quarter wavelength from diodes 57 and 61 respectively. Through a ganged switch unit 66, the diodes at points 56, 57, 59, 61 and 62 may be employed in a lower frequency resolver configuration, and in the second switch position, the diodes at points 57–61 are connected in a higher frequency resolver configuration. Thus with this arrangement the band of operation over which this electric field sensor arrangement may be utilized is easily extended by simple switching and the use of two additional diodes. This switching operation accomplishes the same connection of the circuitry as indicated above in conjunction with FIG. 1 and the mathematics set forth above are applicable to either arrangement. The signal from each diode is taken out through resistance 67 to a suitable terminal 68. Each signal is applied through an adjustable resistance (for providing properly compensated output levels) for combination as indicated above and application to the oscilloscope so that a display of reflection coefficient information on the system under investigation is displayed directly by the oscilloscope trace.

A waveguide embodiment of the invention is illustrated in FIG. 3 in which electric probe units 71–75 are similarly spaced. These probes extend into the waveguide 76 and function as antennas which sense an electrical wave component in the waveguide. Each probe is coupled through the square law detector such as a crystal 78 with a load 80 connected to the junction between the probe and the crystal. The output signals from the end detectors corresponding to probes 71 and 75 are applied through balancing potentiometers 82 which balance the crystal detector efficiencies so that the same rectification values are obtained. The output signals are then applied on a single line through an adjusting potentiometer 84 to the Y+ terminal 86 of the oscilloscope. The signal from the detector connected to center probe 73 is connected through an adjusting potentiometer 84 to the Y− terminal 90; and the signals from the detectors connected to the two intermediate probes 72 and 74 are connected through adjusting potentiometers 84 to the X+ and X− terminals 92, 94 respectively of the oscilloscope.

A modified form of resolver constructed in accordance with principles of the invention is shown in FIGS. 4–7. In certain systems it may be desirable to employ directional couplers to extract portions of the incident and reflected waves and apply these portions to a remotely located resolver. In low signal level systems relatively tight coupling (in the order of −3–4 db) is necessary and it has been found that a resolver employing a single transmission line introduces distortions into the tightly coupled system under test. The adverse effect on the system under test is avoided while still providing an accurate plot of impedance or similar types of information by the apparatus shown in FIG. 4. In this system two directional couplers 100, 102 are connected to transmission line 12′, directional coupler 100 extracting the forward or incident wave and directional coupler 102 extracting the reflected wave. The signal extracted by directional coupler 100 is applied through suitable phase shift apparatus 104 to the resolver 106 over line 108, while the reflected wave signal is applied from directional coupler 102 directly to the resolver over line 110. A waveguide configuration of this resolver 106 is shown in FIG. 5 and a strip line configuration is shown in FIGS. 6 and 7.

The incident wave signal is applied through the phase shifter 104 to a first waveguide section 112 in the resolver 106. Probes 113–117 extend into section 112. The reflected wave signal is applied over line 110 to a second waveguide section 120 having similar electric field probes 121–125 extending thereinto. Each waveguide section 112, 120 is suitably terminated to reduce reflections, this termination being indicated generally by resistance 126. A terminal 128 of a crystal detector 130 is connected to each incident wave probe and each corresponding reflected wave probe is capacitively coupled (through capacitance 132) to the other terminal 133 of the detector. At that junction point a signal is extracted which is a function of the square of the difference between the reflected and incident wave signals. These signals (on output lines 134–138) are combined as above described for application to a suitable display device or other recording apparatus. As the same algebra is applicable with the exception that vector differences rather than vector sums are involved, similar reference charts are employed.

In the embodiment shown in FIGS. 6 and 7 two transmission lines are illustrated, FIG. 7 being an expanded view of one of the detector and terminal elements of the apparatus of FIG. 6. The incident wave is applied on strip line 150 and the reflected wave is applied on strip line 152. The strip lines 150, 152 are on either side of a ground plane 154 and are spaced from it by dielectric sheets 156. Connected to the bottom strip line 150 is one terminal of diode 160. The upper strip line 152 has a layer of dielectric tape 162 thereon which separates that line from conductive plate 164 that is connected to the other terminal 166 of the diode. The terminal 166 is connected through resistor 168 and a conventional output terminal 170 appropriately secured to the casing 172 of the resolver structure. Strip line 150 is connected to the associated circuity via terminals 174, 176, and strip line 152 is connected to its associated circuitry via terminals 178, 180.

Thus the invention enables the measurement and display in polar form of complex impedance or admittance values, for example, over a wide range of frequencies. It may be employed with a variety of loads, for example, in conjunction with a hybrid junction to sense wave characteristics of an antenna array. The apparatus of the invention may be embodied in open wire line, coaxial or waveguide configuration and has been constructed for operation over frequency ranges from 10 to 12,000 megacycles per second. When the resolver is employed with an oscilloscope a suitable reference, such as a full scale or expanded Smith chart, may be employed so that impedance values may be directly identified from the oscilloscope trace. Thus the invention provides a simple, yet accurate and versatile, apparatus that enables the variation in impedance as a function of frequency to be observed over a continuous band of frequencies facilitating proper adjustment of equipment for example; and rapid and coordinated investigations of transmission characteristics in general.

While preferred embodiments of the invention have been shown and described, various modifications therein will be obvious to those skilled in the art and therefore it is not intended that the invention be limited to the described embodiments or to details thereof and departures may be made therefrom within the spirit and scope of the invention as defined in the claims.

I claim.

1. Apparatus for plotting information on a device under test comprising a signal generator having a constant amplitude output operative in the ultrahigh frequency and microwave region,
   a transmission medium coupled to said signal generator for transmitting energy provided by said signal generator to said device,
   a set of five probe circuits symmetrically disposed along said transmission medium for providing unmodulated signals representing the amplitudes of standing waves in said transmission medium,
   said probe circuits being spaced at one-eighth wavelength intervals as a function of a test frequency,
   first circuit means to combine signals from the two outside probe circuits and the center probe circuit to produce a first signal relative to a first reference plane,
   second circuit means to combine signals from the two intermediate probe circuits to produce a second signal related to a second reference plane in quadrature to said first reference plane,
   display means having first and second input circuits,
   and means to apply said first signal to said first input circuit and said second signal to said second input circuit to provide a plot of a characteristic of the device under test.

2. The apparatus as claimed in claim 1 and further including an additional probe circuit at each end of said set of probe circuits, each said additional probe circuit being effectively spaced at one quarter wavelength interval as a function of said test frequency from the immediately adjacent outside probe of said set, and means to selectively interconnect said center, said outside and said additional probe circuits for combining signals therefrom for application to said display means to provide a plot of a characteristic of the device under test over a lower range of frequencies than the range of frequencies employed in the utilization of said set of probe circuits.

3. The apparatus as claimed in claim 1 wherein said transmission medium is a coaxial line having a cylindrical outer conductor and a center conductor coaxially disposed therein, and each said probe circuit includes a square law detector element mechanically supported on and electrically connected to said center conductor, and means extending through said cylindrical outer conductor for extracting said unmodulated signal from said coaxial line.

4. The apparatus as claimed in claim 3 wherein said center conductor has a uniformly reduced diameter along the length of which are spaced five probe circuit positioning configurations, each said configuration including a conical seat and a cylindrical channel coaxial with said conical seat and extending into said center conductor perpendicular to the axis thereof, and each square law detector is a crystal diode element seated on said conical seat and having a terminal extending into said cylindrical channel.

5. The apparatus as claimed in claim 1 wherein said transmission medium is a waveguide and each said probe circuit includes an antenna element extending into said waveguide in a direction perpendicular to the direction of signal transmission through said waveguide, and a square law detector element electrically connected to said antenna element for providing an unmodulated signal representing the amplitude of standing waves in said waveguide as sensed by said antenna element.

6. Apparatus for providing information on characteristics of a system operable in the ultra high and microwave frequency region comprising two transmission lines, means to apply incident wave information from the system under investigation to one of said transmission lines, means to apply reflected wave information from the system under investigation to the other of said transmission lines, and a probe network interconnecting said transmission lines including a set of five probe circuits symmetrically disposed along said transmission lines for providing unmodulated signals representing differences between said incident and reflected waves, said probe circuits being spaced at one-eighth wavelength intervals as a function of a test frequency in said ultra high and microwave frequency region, each said probe circuit including a pair of probe elements and an output line coupled to said pair of probe elements, one probe element extending into one of said transmission lines, the second probe element being correspondingly located and extending into the second transmission line, and said output line being capacitively coupled to one of said pair of corresponding probes and being coupled through a square law detector to the other of said pair of corresponding probes.

7. The apparatus as claimed in claim 6 wherein each said transmission line is a waveguide, and each said probe element includes an antenna element extending into said waveguide in a direction perpendicular to the direction of signal transmission through said waveguide, and said square law detector is a crystal diode electrically connected to one of said antenna elements for providing an unmodulated signal representing the amplitude of standing waves in said waveguide as sensed by said antenna element.

8. The apparatus as claimed in claim 6 wherein each said transmission line includes a pair of parallel conductors and further including a ground plane structure disposed between said pairs of parallel conductors.

9. Apparatus for providing information on characteristics of a system operable in the ultra high and microwave frequency region comprising two transmission lines, means to extract incident wave information from the system under investigation and to apply said incident wave information to one of said transmission lines, means to extract reflected wave information from the system under investigation and to apply said reflected wave information to the other of said transmission lines, phase shift means to adjust the phase relation of said incident and reflection wave information applied to said transmission means, and a probe network interconnected in said transmission lines including a set of five probe circuits symmetrically disposed along said transmission lines for providing unmodulated signals representing differences between said incident and reflected waves, said probe circuits being spaced at one-eighth wavelength intervals as a function of a test frequency in said ultrahigh and microwave frequency region, and each including a pair of probe elements and an output line coupled to said pair of probe elements, one probe element extending into one of said transmission lines, the second probe element being correspondingly located and extending into the second transmission line, and said output line being capacitively coupled to one of said pair of corresponding probes and being coupled through a square law detector to the other of said pair of corresponding probes, first circuit means to combine signals from the two outside probe circuits and the center probe circuit to produce a first signal relative to a first reference plane, second circuit means to combine signals from the two intermediate probe circuits to produce a second signal related to a second reference plane in quadrature to said first reference plane, display means having first and second input circuits, and means to apply said first signal to said first input circuit and said second signal to said second input circuit to provide a plot of a characteristic of the system under test.

10. Apparatus for plotting reflection coefficient information on a device under test comprising a signal generator having a constant amplitude output operative in the ultrahigh and microwave region, a transmission medium coupled to said said signal generator for transmitting energy provided by said signal generator to said device, a set of five electric field probes symmetrically disposed along the path of energy along said transmission medium for providing unmodulated signals representing the amplitudes of standing waves in said transmission medium, said probes being spaced at one-eighth wavelength intervals as a function of a test frequency, first circuit means to combine signals from the two outside probes and the center probe to produce a first signal proportional to $\rho \sin \theta$, where $\rho$ is the magnitude of the reflection coefficient and $\theta$ is its phase angle, second circuit means to combine signals from the two intermediate probes to produce a second signal proportional to $\rho \cos \theta$,
an oscilloscope having a vertical deflection circuit and a horizontal deflection circuit,
and means to apply said first signal to one of said deflection circuits and said second signal to the other of said deflection circuits to provide a plot of a characteristic of the device under test.

11. Apparatus for measuring the reflection coefficient of an electromagnetic wave load comprising means for transmitting constant amplitude electromagnetic waves to said load,
said load reflecting the portion of said electromagnetic waves depending on the value of said reflection coefficient,
five electric field probes symmetrically disposed along said electromagnetic wave transmission means,
said probes being spaced at one-eighth wavelength intervals relative to one another,
detector means coupled to each said probe for providing an unmodulated signal proportional to the square of the magnitude of the electric field sensed by the associated probe,
means connecting the two outside probes to produce a first signal,
means to differentially combine the signal from the center probe and said first signal,
means to differentially combine the signals from the two intermediate probes and means to apply said differentially combined signals to a utilization device.

12. Apparatus for providing information on characteristics of a system operable in the ultra high and microwave frequency region comprising a transmission line adapted to be coupled into said system to receive signals from a signal generator having a constant amplitude output,
a set of five electric field probe circuits symmetrically disposed along said transmission line and spaced at one-eighth wavelength intervals as a function of a test frequency signal from said signal generator in said ultrahigh and microwave frequency region,
each said electric field probe circuit including a probe element, and a square law detector element connected between said probe element and a reference potential for providing an unmodulated signal as a function of the square of the amplitude of standing waves in said transmission line as sensed by the electric field probe element,
means to adjust each said unmodulated signal to compensate for different detector efficiencies,
first circuit means to combine said unmodulated signals from the two outside probe circuits and the center probe circuit to produce a first signal related to a first reference plane,
and second circuit means to combine said unmodulated signals from the two intermediate probe circuits to produce a second signal related to a second reference plane in quadrature to said first reference plane.

13. The apparatus as claimed in claim 12 and further including an additional probe circuit at each end of said set of probe circuits,
each said additional probe circuit being effectively spaced at one-quarter wavelength interval as a function of said test frequency from the immediately adjacent outside probe of each set,
and means to selectively interconnect said center, said outside and said additional probe circuits for combining signals therefrom to provide information on a characteristic of the system under test over a lower range of frequencies than the range of frequencies employed in the utilization of said set of probe circuits.

14. The apparatus as claimed in claim 12 wherein said transmission line is a coaxial line having a cylindrical outer conductor and a center conductor coaxially disposed therein,
and each said probe circuit includes a square law detector element mechanically supported on and electrically connected to said center conductor,
and means extending through said cylindrical outer conductor for extracting said unmodulated signal from said coaxial line.

15. The apparatus as claimed in claim 14 wherein said center conductor has a uniformly reduced diameter along the length of which are spaced five probe circuit positioning configurations,
each said configuration including a conical seat and a cylindrical channel coaxial with said conical seat and extending into said center conductor perpendicular to the axis thereof and each square law detector is a crystal diode element seated on said conical seat and having a terminal extending into said cylindrical channel.

16. The apparatus as claimed in claim 12 wherein said transmission line is a waveguide,
each said probe circuit includes an antenna element extending into said waveguide in a direction perpendicular to the direction of signal transmission through said waveguide,
and said square law detector is a crystal diode electrically connected to one of said antenna elements for providing an unmodulated signal representing the amplitude of standing waves in said waveguide as sensed by said antenna element.

17. Apparatus for providing information on characteristics of a system operable in the ultrahigh and microwave frequency region comprising
a transmission line adapted to be coupled into said system to receive constant amplitude signals from a signal generator,
a set of five probe circuits symmetrically disposed along said transmission line and spaced at one-eighth wavelength intervals as a function of a test frequency in said ultrahigh and microwave frequency region,
each said probe circuit including a probe element, and means connected to said probe element for providing an output signal as a function of signals transmitted in said transmission line as sensed by said probe element,
first circuit means to combine said output signals from the two outside probe circuits and the center probe circuit to produce a first signal related to a first reference plane,
and second circuit means to combine said output signals from the two intermediate probe circuits to produce a second signal related to a second reference plane in quadrature to said first reference plane.

18. The apparatus as claimed in claim 17 wherein said transmission line is a coaxial line having a cylindrical outer conductor and a center conductor coaxially disposed therein, and each said probe includes a square law detector electrically connected to said center conductor, and means extending through said cylindrical outer conductor for extracting said output signal from said coaxial line.

19. The apparatus as claimed in claim 17 wherein said transmission line is a waveguide, each said probe circuit includes an antenna element extending into said waveguide in a direction perpendicular to the direction of signal transmisison through said waveguide, and said output signal providing means includes a square law detector connected to said antenna element.

20. The apparatus as claimed in claim 17 and further including an additional probe circuit at each end of said set of probe circuit, each said additional probe circuit being effectively spaced at one-quarter wavelength intervals as a function of said test frequency from the immediately adjacent outside probe of each set, and means to selectively interconnect said center, said outside, and said additional probe circuits for combining signals therefrom to provide information on a characteristic of the system under test over a lower range of frequencies in the range of frequencies employed in the utilization of said set of probe circuits.

References Cited by the Examiner

UNITED STATES PATENTS 2,605,323  7/1952  Samuel _____ 324—58

FOREIGN PATENTS 821,052  7/1949  Germany.

WALTER L. CARLSON, *Primary Examiner.*